US008168304B2

(12) United States Patent
Zhang et al.

(10) Patent No.: US 8,168,304 B2
(45) Date of Patent: May 1, 2012

(54) MICRONIZED WOOD PRESERVATIVE FORMULATIONS COMPRISING BORON COMPOUNDS

(75) Inventors: Jun Zhang, Getzville, NY (US); Wenjin Zhang, Tonawanda, NY (US); Robert M. Leach, Grand Island, NY (US)

(73) Assignee: Osmose, Inc., Buffalo, NY (US)

( * ) Notice: Subject to any disclaimer, the term of this patent is extended or adjusted under 35 U.S.C. 154(b) by 0 days.

(21) Appl. No.: 12/691,707

(22) Filed: Jan. 21, 2010

(65) Prior Publication Data
US 2010/0183868 A1    Jul. 22, 2010

Related U.S. Application Data

(63) Continuation of application No. 11/354,726, filed on Feb. 15, 2006, now abandoned, which is a continuation-in-part of application No. 11/126,839, filed on May 11, 2005, now abandoned, said application No. 11/354,726 is a continuation-in-part of application No. 10/970,446, filed on Oct. 21, 2004, said application No. 11/354,726 is a continuation-in-part of application No. 11/116,152, filed on Apr. 27, 2005, now abandoned, and a continuation-in-part of application No. 10/821,326, filed on Apr. 9, 2004, now Pat. No. 7,674,481.

(60) Provisional application No. 60/570,659, filed on May 13, 2004, provisional application No. 60/568,485, filed on May 6, 2004, provisional application No. 60/565,585, filed on Apr. 27, 2004, provisional application No. 60/461,547, filed on Apr. 9, 2003, provisional application No. 60/518,994, filed on Nov. 11, 2003.

(51) Int. Cl.
*B27K 3/22* (2006.01)
*B27K 3/38* (2006.01)
*A01N 59/16* (2006.01)
*A01N 59/20* (2006.01)
*C09K 15/14* (2006.01)
*C09K 15/16* (2006.01)

(52) U.S. Cl. ............ 428/541; 428/535; 428/537.1; 424/630; 424/641; 106/18.13; 106/18.3; 427/180; 427/181; 427/297; 427/393; 427/397; 427/440

(58) Field of Classification Search .......... 428/537.1, 428/535, 541
See application file for complete search history.

(56) References Cited

U.S. PATENT DOCUMENTS
1,388,513 A    8/1921    Chandler
(Continued)

FOREIGN PATENT DOCUMENTS
CA    2103470    8/1994
(Continued)

OTHER PUBLICATIONS

Koch, C.C., Synthesis of Nanostructured Materials by Mechanical Milling: Problems and Opportunities, NanoStructured Materials, vol. 9, pp. 13-22, 1997.

(Continued)

*Primary Examiner* — Joseph D Anthony
(74) *Attorney, Agent, or Firm* — Covington & Burling LLP

(57) ABSTRACT

The present invention provides wood preservative and flame retardant compositions having low leachability comprising micronized boron compounds and, optionally, one or more organic biocides which may be micronized. Also provided is a method for applying the composition to wood and wood products comprising impregnating the wood with the composition.

16 Claims, 3 Drawing Sheets

U.S. PATENT DOCUMENTS

| | | | |
|---|---|---|---|
| 1,999,458 A | 4/1935 | Hollister | |
| 3,007,844 A | 11/1961 | Schultz | |
| 3,535,423 A | 10/1970 | Ordas | |
| 3,816,307 A | 6/1974 | Woods | |
| 3,945,835 A | 3/1976 | Clarke et al. | |
| 3,968,276 A * | 7/1976 | Allen | 427/297 |
| 4,058,607 A | 11/1977 | Hennart et al. | |
| 4,062,991 A | 12/1977 | Kyte et al. | |
| 4,142,009 A * | 2/1979 | Kyte et al. | 427/297 |
| 4,310,590 A | 1/1982 | Petigara | |
| 4,313,976 A | 2/1982 | Leach | |
| 4,622,248 A | 11/1986 | Leach et al. | |
| RE32,329 E | 1/1987 | Paszner | |
| 4,649,065 A | 3/1987 | Hein et al. | |
| 4,663,364 A | 5/1987 | Iwasaki et al. | |
| 4,741,971 A | 5/1988 | Beck | |
| 4,897,427 A | 1/1990 | Barnavon et al. | |
| 4,923,894 A | 5/1990 | Kanda et al. | |
| 4,935,457 A * | 6/1990 | Metzner et al. | 524/14 |
| 5,196,407 A | 3/1993 | Goletz et al. | |
| 5,277,979 A | 1/1994 | Kielbania, Jr. et al. | |
| 5,304,376 A | 4/1994 | Friedrichs et al. | |
| 5,342,438 A | 8/1994 | West | |
| 5,424,077 A | 6/1995 | Lajoie | |
| 5,426,121 A | 6/1995 | Bell | |
| 5,438,034 A | 8/1995 | Walker | |
| 5,462,589 A | 10/1995 | Nicholas | |
| 5,484,934 A | 1/1996 | Ikeda | |
| 5,527,384 A | 6/1996 | Williams et al. | |
| 5,536,305 A | 7/1996 | Yu et al. | |
| 5,552,378 A | 9/1996 | Trinh et al. | |
| 5,635,217 A | 6/1997 | Goettsche et al. | |
| 5,667,795 A | 9/1997 | Fraley et al. | |
| 5,714,507 A | 2/1998 | Valcke et al. | |
| 5,763,364 A | 6/1998 | Frisch et al. | |
| 5,833,741 A | 11/1998 | Walker | |
| 5,874,025 A | 2/1999 | Heuer et al. | |
| 5,874,476 A | 2/1999 | Hsu et al. | |
| 5,879,025 A | 3/1999 | Blumenthal | |
| 5,972,266 A | 10/1999 | Fookes | |
| 5,990,043 A | 11/1999 | Kugler | |
| 6,110,263 A | 8/2000 | Goettsche et al. | |
| 6,123,756 A | 9/2000 | Poppen | |
| 6,274,199 B1 | 8/2001 | Preston et al. | |
| 6,306,202 B1 | 10/2001 | West | |
| 6,352,583 B1 | 3/2002 | Goettsche et al. | |
| 6,482,814 B1 | 11/2002 | Bath | |
| 6,485,790 B2 | 11/2002 | Walker | |
| 6,503,306 B1 | 1/2003 | Watkins | |
| 6,514,512 B1 | 2/2003 | Puterka | |
| 6,521,288 B2 * | 2/2003 | Laks et al. | 427/180 |
| 6,541,038 B1 | 4/2003 | Tanaka et al. | |
| 6,558,685 B1 | 5/2003 | Kober | |
| 6,576,661 B1 | 6/2003 | Bruck et al. | |
| 6,585,989 B2 | 7/2003 | Herbst | |
| 6,753,035 B2 | 6/2004 | Laks et al. | |
| 6,849,276 B1 | 2/2005 | Dufau et al. | |
| 6,905,531 B2 | 6/2005 | Richardson et al. | |
| 6,905,532 B2 | 6/2005 | Richardson et al. | |
| 7,316,738 B2 * | 1/2008 | Richardson et al. | 106/18.32 |
| 7,449,130 B2 | 11/2008 | Lloyd | |
| 7,674,481 B2 * | 3/2010 | Leach et al. | 424/630 |
| 7,851,021 B2 * | 12/2010 | Joyce et al. | 427/297 |
| 2002/0051892 A1 | 5/2002 | Laks et al. | |
| 2002/0128367 A1 | 9/2002 | Daisey, Jr. et al. | |
| 2004/0258767 A1 | 12/2004 | Leach et al. | |
| 2004/0258768 A1* | 12/2004 | Richardson et al. | 424/630 |
| 2004/0258838 A1 | 12/2004 | Richardson et al. | |
| 2005/0013939 A1 | 1/2005 | Vinden | |
| 2005/0107467 A1 | 5/2005 | Richardson | |
| 2005/0118280 A1* | 6/2005 | Leach et al. | 424/617 |
| 2005/0130866 A1 | 6/2005 | Richardson et al. | |
| 2005/0152994 A1 | 7/2005 | Leach et al. | |
| 2005/0182152 A1 | 8/2005 | Nonninger et al. | |
| 2005/0249812 A1 | 11/2005 | Leach et al. | |
| 2005/0252408 A1 | 11/2005 | Richardson et al. | |
| 2005/0255251 A1 | 11/2005 | Hodge et al. | |
| 2005/0256026 A1 | 11/2005 | Hodge et al. | |
| 2005/0265893 A1 | 12/2005 | Leach et al. | |
| 2006/0062926 A1 | 3/2006 | Richardson et al. | |
| 2006/0075921 A1 | 4/2006 | Richardson et al. | |
| 2006/0075923 A1 | 4/2006 | Richardson | |
| 2006/0078686 A1 | 4/2006 | Hodge et al. | |
| 2006/0086841 A1 | 4/2006 | Richardson et al. | |
| 2006/0257578 A1* | 11/2006 | Zhang et al. | 427/393.3 |
| 2011/0091575 A1* | 4/2011 | Hayson et al. | 424/634 |

FOREIGN PATENT DOCUMENTS

| | | |
|---|---|---|
| DE | 41 12 652 | 10/1992 |
| EP | 0 472 973 | 3/1992 |
| EP | 1 034 903 | 9/2000 |
| GB | 1 491 330 | 11/1977 |
| JP | 61-244502 | 10/1986 |
| JP | 61-246002 | 11/1986 |
| JP | S62-39201 | 2/1987 |
| JP | S62-116102 | 5/1987 |
| JP | 10-26401 | 1/1989 |
| JP | 10-264401 | 1/1989 |
| JP | 10-272610 | 10/1998 |
| JP | 2000-102907 | 4/2000 |
| JP | 01/91925 | 12/2001 |
| SE | 379 167 | 9/1975 |
| WO | 85/00040 | 1/1985 |
| WO | 00/05955 | 2/2000 |
| WO | 00/24259 | 5/2000 |
| WO | 00/24528 | 5/2000 |
| WO | 00/78281 | 12/2000 |
| WO | 02/06417 | 1/2002 |
| WO | WO 02/06417 A1 * | 1/2002 |
| WO | 03/103392 | 12/2003 |

OTHER PUBLICATIONS

Backman, P.A., et al., The Effects of Particle Size and Distribution on Performance of the Fungicide Chlorothalonil, Phytopathology, St. Paul, MN, US, vol. 66, No. 10, 1, Jan. 1, 1976, pp. 1242-1245, XP998952811.

Supplementary European Search Report for PCT/US2005/016503 dated Feb. 2, 2009.

Supplementary European Search Report for PCT/US2005/037303 dated Feb. 2, 2009.

The Merck Index (12 Ed. 1996) Merck & Co., Inc.

Davis, Food Storage and Preservative-Treated Wood, Alaska Science Forum (Mar. 10, 1980) [online] [retrieve on Nov. 10, 2008]. URL: http://www.gi.alaska.edu/Science Forum/ASF380.htm/.

STN online, file SciSearch, Acc. No. 1993:540390 (Siegfried, Comparative Toxicity of Pyrethoid Insecticides to Terrestial and Aquatic Needs, Environmental Toxicology and Chemistry (1993), vol. 12, No. 9, pp. 1683-1689.

Liu, Y., et al., Use of Nanoparticles for the Controlled Release of Biocides in Pressure-Treated Solid Wood, Polymer Preprints 38(2), 1997, pp. 624-625.

Liu, Y., et al., Michigan Technical Univ., Dept. of Chemistry, Houghton, MI; "Use of Polymeric Nanoparticles for Controlled Release of Biocides in Solid Wood," Materials Research Society Symposium Proceedings Series; 1998; vol. 550, Abstract GG3.4.

Liu, Y. Use of Polymer Nanoparticles as Carriers for the Controlled Release of Biocides iin Solid Wood, Ph.D. Dissertation of Yong Liu; MI Tech Univ, Houghton MI, 1999.

Liu, Y., et al., Use of Nanoparticles for Controlled Release of Biocides in Solid Wood, Journal of Applied Polymer Science, vol. 79, 2001, pp. 458-465.

Lide, Characteristics of Particles and Particle Dispersoids, Handbook of Chemistry and Physics; 75th Edition; 1994; Florida: CRC Press, pp. 15-38.

Shaw, www.fda.gov/ohrms/dockets/ac/01/slides/3763s2_09_shaw.ppt; 2001.

Hawley's Condensed Chemical Dictionary, 14th edition; John Wiley & Sons, Inc., 2001, p. 86.

Superior Court of New Jersey, Decision after Trial, *Phibro-Tech, Inc.* v. *Osmose Holdings, Inc.*, Jun. 25, 2007.

Superior Court of New Jersey, Chancery Division, Final Judgment, *Phibro-Tech, Inc.* v. *Osmose Holdings, Inc.*, Aug. 14, 2007.

\* cited by examiner

Coniferous Wood Anatomy

Bordered Pit

MICRONIZED WOOD PRESERVATIVE FORMULATIONS COMPRISING BORON COMPOUNDS

This application is a continuation of U.S. Nonprovisional application Ser. No. 11/354,726, filed on Feb. 15, 2006, now abandoned, which is a continuation-in-part of U.S. Nonprovisional application Ser. No. 11/126,839, filed on May 11, 2005, now abandoned, which claims priority to U.S. Provisional Application No. 60/570,659, filed on May 13, 2004. U.S. Nonprovisional application Ser. No. 11/354,726 is also a continuation-in-part of U.S. Nonprovisional application Ser. No. 10/970,446, filed on Oct. 21, 2004, which claims priority to U.S. Provisional Application No. 60/568,485, filed on May 6, 2004. U.S. Nonprovisional application Ser. No. 11/354,726 is also a continuation-in-part of U.S. Nonprovisional application Ser. No. 11/116,152, filed on Apr. 27, 2005, now abandoned which claims priority to U.S. Provisional Application No. 60/565,585, filed on Apr. 27, 2004, and which is a continuation-in-part of U.S. Nonprovisional application Ser. No. 10/821,326, filed on Apr. 9, 2004, now U.S. Pat. No. 7,674,481, which in turn claims priority to U.S. Provisional Application No. 60/461,547, filed Apr. 9, 2003, and U.S. Provisional Application No. 60/518,994, filed Nov. 11, 2003. The disclosures of all of these applications are incorporated herein by reference.

FIELD OF THE INVENTION

The present invention is related generally to the field of wood preservatives and wood flame retardants, and more particularly to such compositions which comprise micronized boron compounds.

BACKGROUND OF THE INVENTION

Wood and other cellulose based products exposed in an outdoor environment are biodegradable, primarily through attack by microorganisms and insects. As a result, they will decay, weaken in strength, and discolor. Microorganisms causing wood deterioration include brown rots such as *Postia placenta, Gloeophyllum trabeum* and *Coniophora puteana*, white rots such as *Irpex lacteus* and *Trametes versicolor*, dry rots such as *Serpula lacrymans* and *Meruliporia incrassata* and soft rots such as *Cephalosporium, Acremonium*, and *Chaetomium*. Insects which can destroy wood include termites, beetles, ants, bees, wasps, etc. Wood preservatives are used for preserving wood and other cellulose-based materials, such as paper, particleboard, textiles, rope, etc., against organisms responsible for the deterioration of wood.

Wood is also subject to destruction or degradation through other destructive agencies. In particular, wood is generally highly flammable, which can limit its usefulness in applications involving high temperatures or proximity of flames or flammable materials. Boron compounds have been widely used to provide wood with broad spectrum protection against most wood destroying organisms, such as fungi, termites, ants, bees, beetles, etc. Boron compounds, particularly inorganic compounds, are also known to have a flame retardant effect. An advantage of boron compounds over other wood preservatives and flame retardants is their low mammalian toxicity and minimal environmental impact.

Water-soluble boron compounds, such as boric acid, sodium borate and disodium octaborate tetrahydrate (DOT) have been widely used on wood based products for the past few decades. Several boron-containing wood preservative systems, such as copper-chromium-boron (CCB) and copper-boric acid-azole (CBA), have been developed. However, a major limitation of these commercially available preservatives is that the boron compounds readily leach from wood when exposed to environmental moisture, resulting in a diminished bioefficacy, especially over extended time periods. In an effort to reduce the high leachability of boron compounds from treated wood in a moisture environment, many efforts have been directed by researchers in the wood preservation area to fix the boron in the treated wood. U.S. Pat. No. 6,821,631 discloses a two step treatment process for preventing leaching of boron compounds from wood. Wood is treated with an alkali silicate solution followed by treatment with an alkali borate solution. It is thought that the silicate and borate forms a borate-silicate polymer within the wood substrate, imparting leach resistance to wood treated with boron compounds. However, due to the incompatibility of the silicate and borate solutions, this method is likely to create a cross contamination problem in commercial wood treating plants. In addition, the two-step treating process is expensive and time consuming.

U.S. Pat. No. 6,896,908 discloses a leach resistant borate preservative containing borate, copper or zinc, and organic acids.

Aqueous ammonia-based solutions have been widely used to solubilize metal borates, such as copper borate, zinc borate and calcium borate in an attempt to fix borates in wood. U.S. Pat. No. 5,207,823 describes a boron fixation method which includes dissolving copper borate or zinc borate in ammonia or other volatile agents. When the boron containing formulation is impregnated into wood, the volatile agents evaporate, leaving water-insoluble copper or zinc borate residue on the interstices of the wood. U.S. Pat. No. 2,194,827 discloses a boron wood preservative containing an aqueous ammoniacal solution of copper or zinc borate. Similarly U.S. Pat. No. 2,573,253 discloses a process for treating wood with a solution of copper borate in ammonia. However, current processes generally require the dissolution of the boron compound in a solvent, usually ammonia, which can be difficult and dangerous to work with due to its noxious fumes.

In addition to boron-containing biocides, existing wood preservatives can also contain other types of biocides, such as organic biocides. However, many organic biocides have limited water-solubility. Therefore, solubilizing agents, surfactants and wetting agents are often added to either solubilize or form emulsions of the organic biocide to formulate a product that is suitable for the treatment of wood or other cellulosic substrates.

However, the solubilizing agents, surfactants, and wetting agents are costly and the use of these products can result in enhanced leaching of the biocides when the treated material comes into contact with moisture, giving rise to field performance problems and environmental issues. Such enhanced leaching is considered to be the result of the solubilizing agents, surfactants and wetting agents which remain in the wood after treatment.

Despite many efforts to address these deficiencies in existing wood preservatives, there is an unmet need for aqueous boron-based wood preservatives which, upon contact with moisture, exhibit only minimal leaching into the environment.

A few inorganic boron compounds, such as for example, zinc borate, have been employed as flame retardants in wood applications. Generally, the compounds have been used by as a powder incorporated into a matrix. For example, the boron compound is incorporated into plastic by blending a polymer material with boron compounds. In an exemplary use of boron compounds in wood applications, zinc borate is mixed with wood particles, chips fibers or sawdust and a glue or adhesive matrix to form a wood composite product such as, for example Oriented Stand Board (OSB), or particle board. In another example, a boron compound-containing glue or adhesive matrix is used to join wood plys or veneers together (so-called "glue-line" use) to form plywood.

However, the above methods for incorporating flame retardant boron-containing compounds into wood or wood products is only applicable to composite wood products. In order that the boron compound be present throughout the volume of the wood product, it is necessary to mix it with adhesives and chips, pieces or particles of wood prior to the formation of the composite wood product.

A boron compound flame retardant composition, preferably free of polymer or glue matrices, and a method for applying the composition to a wood or wood product substrate, such that appreciable penetration is achieved, would be welcomed in the art.

SUMMARY OF THE INVENTION

The present invention provides compositions for improving the decay-, insect- and fire-resistance of wood, wood products and other cellulose-based materials. Other cellulose-based materials, include, for example, composite wood products, textile fibers, wood pulp, wool and natural fiber. Also provided are methods for preparing the compositions, as well as methods for impregnating wood and wood products with the compositions.

The compositions comprise micronized water-insoluble boron compound preparations. In one embodiment, the compositions additionally comprise organic biocides, which may either be micronized or soluble. In another embodiment the composition is substantially free of adhesives. The term "substantially free" means that adhesives comprise less than 0.1 wt % of the weight of the wood or wood product. In additional embodiments, adhesives comprise less that 0.01 wt % and 0.001 wt % of the wood or wood product.

A method is provided for the preparation of the composition. The method comprises the steps of providing one or more water-insoluble boron compounds and grinding them, in wetting agents and/or dispersants, if desired, to micronized size. The boron compound preservatives comprise boron compound particles having sizes in the range of from 0.001 microns to 25.0 microns. In one embodiment, one or more water-insoluble organic biocides are ground to micronized size with the boron compound. In another embodiment, the organic biocides are ground separately to micronized size and combined with the boron compound after grinding.

Also provided is a method for improving the decay-, insect- and/or flame-resistance of wood, and wood products. The method comprises the step of impregnating a wood or wood product substrate with a composition of the present invention. In one embodiment, the composition comprises one or more inorganic boron compounds. The impregnation can be performed by methods such as vacuum/pressure methods. Wood impregnated with such a composition generally exhibits minimal leaching of boron compounds. It has been observed for micronized particles that in most cases at least 10 wt % of the micronized particles present in the wood substrate after impregnation have penetrated to a depth of 0.3 millimeters or greater. In other embodiments, at least 20 or 35 wt % of the micronized particles present inside the wood substrate after treatment have penetrated to a depth of 0.3 mm or greater.

Also provided is wood through at least a portion of the volume of which is distributed micronized particles of a boron compound, and optionally, an inorganic biocide, which may or may not be micronized. In an embodiment, the boron compound is an inorganic boron compound.

DETAILED DESCRIPTION OF THE INVENTION

Figure 1:
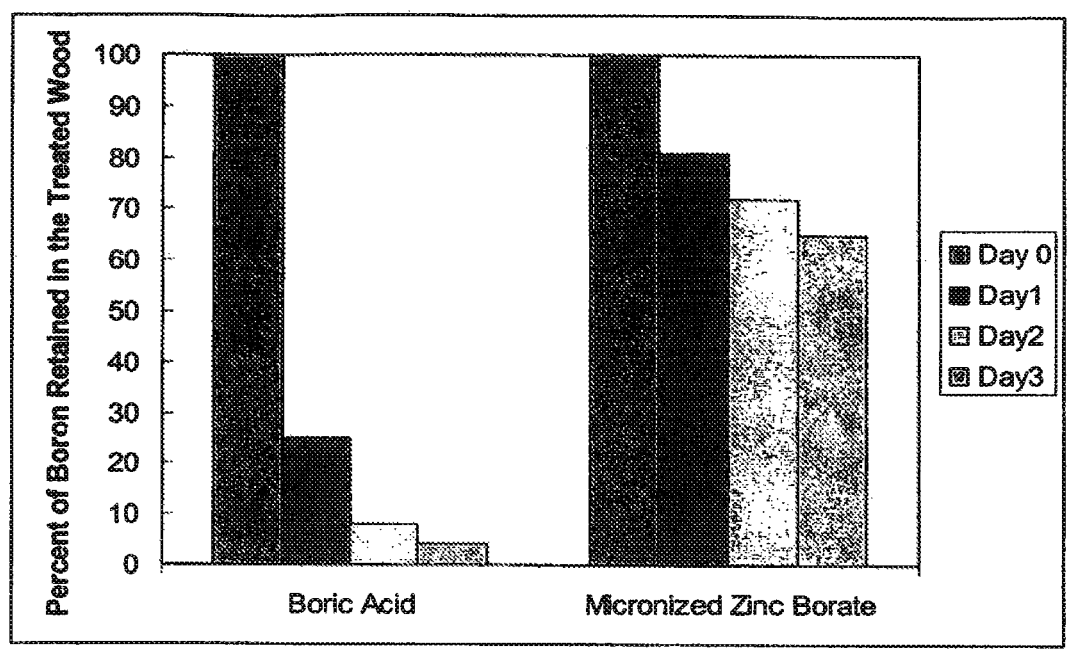
FIG. 1 is a comparison of boron leaching from wood treated with boric acid vs. micronized zinc borate according to AWPA Standard E-11 "Standard Method of Determining the Leachability of Wood Preservatives."

The compositions of the present invention are useful as wood preservatives for protecting cellulosic materials from decay and the associated discoloring, staining/molding, and weakening. Such compositions can also improve the flame retardancy of the cellulosic material to which they are applied.

The term "boron compounds" unless specifically stated otherwise, is intended to refer to compounds which contain the element boron, such as, for example, boron-containing minerals, borate compounds, boron ester compounds, and other organic or inorganic boron-containing compounds.

The term "micronized" as used herein means a particle size in the range of 0.001 to 25 microns. Furthermore, it should be understood that "micronized" does not refer only to particles which have been produced by the finely dividing, such as by mechanical grinding or impinging jet, of materials which are in bulk or other form. Micronized particles can also be formed by other mechanical, chemical or physical methods, such as, for example, formation in solution or in situ, with or without a seeding agent.

The term "wood preservative" as used herein means a composition that renders the cellulosic material to which it is applied more resistant to insect, fungal or microbial attack than the same material without having the composition applied.

The term "flame retardant" as used herein means a composition that renders the material to which it is applied more resistant to burning than the same material in the absence of the composition.

The term "particle size" refers to the largest axis of the particle. In the case of a generally spherical particle, the largest axis is the diameter.

The term "cellulosic material" includes wood; wood products such as composite wood products (Oriented Strand Board, particle board, plywood, laminated veneer lumber (LVL) and other laminated wood products, etc.); paper and paper products; textiles having a cellulose component; rope and other products containing cellulose fiber, etc.

The wood preservative and/or flame retardant compositions of the present invention comprise one or more micronized boron compounds, and optionally, one or more organic biocides. The organic biocides may be present as micronized particles or, they may be solvated in the aqueous solution of the composition.

The leaching of boron compound, (as well as organic biocide, if present as micronized particles), from wood treated with the compositions of the present invention is generally less than that observed from wood treated with non-micronized compositions.

For the purposes herein, a boron compound or organic biocide will be considered to have the ability to remain in the wood preservative composition as micronized particles without completely dissolving (i.e., "micronized") if the compound has a solubility of less than or equal to 1.0 g per 100 grams of carrier at 25° C. More preferred is a solubility of less than or equal to 0.5 g per 100 grams of carrier at 25° C., and even more preferred is a solubility of less than or equal to 0.1 g per 100 grams of carrier at 25° C.

Preferred boron compounds are metal borate compounds (including the lanthanide and actinide series elements) such as calcium, zinc, copper, cobalt, magnesium, cadmium, silver, nickel, iron, etc. The resulting boron compound composition can optionally be mixed with a variety of biocides such as, for example, fungicides and insecticides to produce a dispersion formulation.

The compositions of the present invention can be used against a broad spectrum of wood decay fungi. Typical wood decay fungi include brown rot fungi, white rot fungi, and soft rot fungi. Examples of brown rot fungi are: *Coniophora puteana, Serpula lacrymans, Antrodia vaillantii, Gloeophyllum trabeum, Gleoeophyllum sepiarium, Lentinum lepideus, Oligoporus placenta, Meruliporia incrassate, Daedalea quercina, Postia placenta*. Examples of white rot fungi are: *Trametes versicolor, Phanerochaete chrysosporium, Pleurotus ostreatus, Schizophyllum commune, Irpex lacteus*. Examples of white rot fungi are *Chaetomium globosum, Lecythophora hoffinannii, Monodictys putredinis, Humicola alopallonella, Cephalosporium, Acremonium*, and *Chaetomium*.

The compositions of the present invention can also be used against a broad range of insects and wood borers, such as termites, beetles, and marine borers. Examples of termites include drywood termites such as *Cryptotermes* and *Kalotermes*, and dampwood termites such as *Zootermopsis*, subterranean termites such as *Coptotermes, Mastotermes, Reticulitermes, Schedorhinotermes, Microcerotermes, Microtermes*, and *Nasutitennes*. Examples of beetles include those in the following families: Anoniidae, Bostrychidae, Cerambycidae, Scolytidae, Curculionidae, Lymexylonidae, and Buprestidae.

Boron compounds which can be used in the present invention include metal borates, borate minerals, borate esters and other inorganic or organic borates. One of skill in the art will recognize that the foregoing categories may overlap. For example, inorganic borates include metal borates and borate minerals. Typical examples of metal borates include compounds such as, for example, calcium borate, borate silicate, aluminum silicate borate hydroxide, silicate borate hydroxide fluoride, hydroxide silicate borate, sodium silicate borate, calcium silicate borate, aluminum borate, magnesium borate, iron borate, copper borate, zinc borate, etc.

Typical examples of borate minerals include the following, many of which contain metals and are thus also metal borates: Admontite (Hydrated Magnesium Borate); Aksaite (Hydrated Magnesium Borate Hydroxide); Ameghinite (Sodium Borate Hydroxide); Ammonioborite (Hydrated Ammonia Borate); Aristarainite (Hydrated Sodium Magnesium Borate); Bandylite (Copper Hydroborate Chloride); Behierite (Tantalum Niobium Borate); Berborite (Hydrated Beryllium Borate Hydroxide Fluoride); Biringuccite (Hydrated Sodium Borate Hydroxide); Blatterite (Manganese Magnesium Antimony Iron Borate Oxide); Boracite (Magnesium Borate Chloride); Borax (Hydrated Sodium Borate); Braitschite (Hydrated Calcium Sodium Cerium Lanthanum Borate); Calciborite (Calcium Borate); Chambersite (Manganese Borate Chloride); Chelkarite (Hydrated Calcium Magnesium Borate Chloride); Clinokurchatovite (Calcium Magnesium Iron Manganese Borate); Colemanite (Hydrated Calcium Borate Hydroxid); Congo lite (Iron Magnesium Manganese Borate Chloride); Diomignite (Lithium Borate); Ekaterinite (Hydrated Calcium Borate Chloride Hydroxide); Ericaite (Iron Magnesium Manganese Borate Chloride); Ezcurrite (Hydrated Sodium Borate); Fabianite (Calcium Borate Hydroxide); Federovskite (Calcium Magnesium Manganese Borate Hydroxide); Fluoborite (Magnesium Borate Fluoride Hydroxide); Frolovite (Calcium Hydroborate); Ginorite (Hydrated Calcium Borate); Gowerite (Hydrated Calcium Borate); Halurgite (Hydrated Magnesium Borate Hydroxide); Hambergite (Beryllium Borate Hydroxide); Hemnilite (Calcium Copper Hydroborate Hydroxide); Hexahydroborite (Hydrated Calcium Hydroborate); Hilgardite (Hydrated Calcium Borate Chloride); Howlite (Calcium Borate Silicate Hydroxide; Hulsite (Iron Magnesium Antimony Borate); Hungchaoite (Hydrated Magnesium Borate Hydroxide); Hydroboracite (Hydrated Calcium Magnesium Borate Hydroxide); Hydrochlorborite (Hydrated Calcium Borate Chloride Hydroxide); Inderborite (Hydrated Calcium Magnesium Borate Hydroxide); Inderite (Hydrated Magnesium Borate Hydroxide); Inyoite (Hydrated Calcium Borate Hydroxide); Jeremejevite (Aluminum Borate Fluoride Hydroxide); Jimboite (Manganese Borate); Johachidolite (Calcium Aluminum Borate); Kaliborite (Hydrated Potassium Magnesium Borate Hydroxide); Karlite (Magnesium Aluminum Borate Hydroxide Chloride); Kernite (Hydrated Sodium Borate); Korzhinskite (Hydrated Calcium Borate); Kotoite (Magnesium Borate); Kurchatovite (Calcium Magnesium Manganese Iron Borate); Kurnakovite (Hydrated Magnesium Borate Hydroxide); Larderellite (Ammonia Borate Hydroxide); Ludwigite Group (Magnesium Iron Nickel Titanium Antimony Aluminum Borate); Magnesiohulsite (Magnesium Iron Antimony Borate); Mcallisterite (Hydrated Magnesium Borate Hydroxide); Meyerhofferite (Hydrated Calcium Borate Hydroxide); Nasinite (Hydrated Sodium Borate Hydroxide); Nifontovite (Hydrated Calcium Borate Hydroxide); Nobleite (Hydrated Calcium Borate Hydroxide); Nordenskioldine (Calcium Antimony Borate); Olshanskyite (Calcium Hydroborate); Orthopinakiolite (Magnesium Manganese Borate); Penobsquisite (Hydrated Calcium Iron Borate Hydroxide Chloride); Pentahydroborite (Hydrated Calcium Hydroborate); Peprossiite (Cerium Lanthanum Aluminum Borate); Pinaldolite (Magnesium Manganese Antimony Borate); Pinnoite (Hydrated Magnesium Borate); Preobrazhenskite (Magnesium Borate Hydroxide); Priceite (Calcium Borate Hydroxide); Pringleite (Hydrated Calcium Borate Hydroxide Chloride); Probertite (Hydrated Sodium Calcium Borate Hydroxide); Rhodizite (Potassium Cesium Beryllium Aluminum Borate); Rivadavite (Hydrated Sodium Magnesium Borate); Roweite (Calcium Manganese Borate Hydroxide); Ruitenbergite (Hydrated Calcium Borate Hydroxide Chloride); Santite (Hydrated Potassium Borate Hydroxide); Sassolite (Boric Acid); Satimolite (Hydrated Potassium Sodium Aluminum Chloride); Sborgite (Hydrated Sodium Borate Hydroxide); Shabynite (Hydrated Magnesium Borate Chloride Hydroxide); Sibirskite (Calcium Borate Hydroxide); Sinhalite (Magnesium Aluminum Borate); Solongoite (Calcium Borate Hydroxide Chloride); Strontioborite (Strontium Borate Hydroxide); Strontioginorite (Hydrated Strontium Calcium Borate); Studenitsite (Hydrated Sodium Calcium Borate Hydroxide); Suanite (Magnesium Borate); Sussexite (Magnesium Borate Hydroxide); Szaibelyite (Magnesium Borate Hydroxide); Takedaite (Calcium Borate); Takeuchiite (Magnesium Manganese Iron Borate); Teepleite (Sodium Hydroborate Chloride); Tertschite (Hydrated Calcium Borate); Tincalconite (Hydrated Sodium Borate); Trembathite (Magnesium Iron Borate Chloride); Tunellite (Hydrated Strontium Borate Hydroxide);

Tusionite (Manganese Antimony Borate); Tuzlaite (Hydrated Sodium Calcium Borate Hydroxide); Tyretskite (Hydrated Calcium Borate Hydroxide); Ulexite (Hydrated Sodium Calcium Borate); Uralborite (Calcium Borate Hydroxide); Veatchite (Hydrated Strontium Borate Hydroxide); Vimsite (Calcium Borate Hydroxide); Volkovskite (Hydrated Potassium Calcium Borate Hydroborate Chloride); Wardsmithite (Hydrated Calcium Magnesium Borate); Warwickite (Magnesium Titanium Iron Aluminum Borate Oxide); Wightmanite (Hydrated Magnesium Borate Oxide Hydroxide); and Yuanfulite (Magnesium Iron Aluminum Titanium Borate Oxide)

Typical examples of other inorganic borates which may be used in the present invention include compounds such as, for example, boron oxide, boron fluoride, and boron chloride. Organic borates include borate esters. Among the borate esters which can be used are those that have the chemical formula of $C_mH_nO_3B$, where C is carbon, H is hydrogen, O is oxygen and B is boron, m is an integer of 3 to 100 and preferably in the range of 5 to 20, and n is an integer in the range of 9 to 200, preferably in the range of 10 to 50. Typical examples of boron esters are tri-phenyl borate, tri-n-propyl borate, tri-n-butyl borate, tri-n-amyl borate, tri-tent-butyl borate. It should be appreciated that borate esters having ester substituents which are non-identical may also be used. The "ester substituents" are the groups connected directly to the boron.

The boron compounds which are preferred for flame retardant applications are inorganic boron compounds such as those listed above. Other compounds, such as water-soluble boron compounds (such as, for example, boric acid and sodium borate), and nitrogen containing compounds (such as, for example, urea, melamine, melamine phosphate, and dicyandiamide) can be used in combination with the micronized boron compounds for flame retardant applications.

The micronized particles can be obtained by wetting/dispersing and grinding boron compounds and/or organic biocides into particles ranging from 0.001 micrometers to 25 micrometers using a commercially available grinding mill or other chemical, physical or mechanical means, in the presence of dispersants and/or surfactant additives, if desired. Such additives may be necessary in order to form a stable aqueous dispersion. The micronized particles can be combined with and dispersed in such additives after micronization, if desired. Standard dispersants include acrylic copolymers, aqueous solutions of copolymers having pigment affinity groups, modified polyacrylate, acrylic polymer emulsions, modified lignin and the like.

The boron compound source can be mixed with water with or without addition of a commercially available rheological additive, such as, for example, a cellulosic derivative, to form a finely dispersed suspension.

The compositions of the present invention can be adjusted to a desired pH. For example, the pH can be adjusted to between 2 to 13 by the addition of acids or alkaline components. The acid or alkaline components can be added before, during or after preparation of the micronized particles.

The present invention can include the use of micronized boron compound in conjunction with a water-soluble boron compound. Examples of water-soluble borate compounds which can be used include, for example, sodium borates such as, disodium octaborate tetrahydrate (DOT), sodium tetraborate pentahydrate, and sodium tetraborate decahydrate; ammonium borates such as, for example, ammonium pentaborate; potassium borates and boric acid.

In one embodiment, micronized boron compounds are used in conjunction with an insoluble micronized organic biocide. The boron compound and the insoluble biocide may be micronized separately and then mixed or may be first mixed or combined and then micronized.

In another embodiment, the organic biocide is water-soluble. An aqueous solution of the organic biocide can be prepared, followed by the addition of a micronized boron compound, if desired.

The organic biocides useful in the present invention can be water-soluble or water-insoluble. Such organic biocides, including fungicides, insecticides, moldicides, bactericides, algaecides etc. are well known to those skilled in the art and include azoles, quaternary ammonium compounds, fluoride compounds, and other compounds, as well as combinations thereof. Exemplary azoles include compounds such as some of those mentioned in the Tables below.

Quaternary ammonium compounds that can be mixed with micronized metal formulations include those with the following structures:

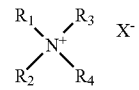

where R1, R2, R3, and R4 are independently selected from alkyl or aryl groups and X⁻ selected from chloride, bromide, iodide, carbonate, bicarbonate, borate, carboxylate, hydroxide, sulfate, acetate, laurate, or any other anionic group. Preferred quaternary ammonium compounds include alkyldimethylbenzylammonium chloride, alkyldimethylbenzylammonium carbonatelbicarbonate, dimethyldidecylammonium chloride, dimethyldidecylammonium carbonatelbicarbonate, etc.

Some non-limiting examples of organic biocides are listed below.

TABLE 1

| Aliphatic Nitrogen Fungicides |
|---|
| butylamine; cymoxanil; dodicin; dodine; guazatine; iminoctadine |
| Amide Fungicides |
| carpropamid; chloraniformethan; cyazofamid; cyflufenamid; diclocymet; ethaboxam; fenoxanil; flumetover; furametpyr; prochloraz; quinazamid; silthiofam; triforine; benalaxyl; benalaxyl-M; furalaxyl; metalaxyl; metalaxyl-M; pefurazoate; benzohydroxamic acid; tioxymid; trichlamide; zarilamid; zoxamide; cyclafuramid; furmecyclox dichlofluanid; tolylfluanid; benthiavalicarb; iprovalicarb; benalaxyl; benalaxyl-M; boscalid; carboxin; fenhexamid; metalaxyl; metalaxyl-M; metsulfovax; ofurace; oxadixyl; oxycarboxin; pyracarbolid; thifluzamide; tiadinil; benodanil; flutolanil; mebenil; mepronil; salicylanilide; tecloftalam fenfuram; furalaxyl; furcarbanil; methfuroxam; flusulfamide |

TABLE 1-continued

Antibiotic Fungicides aureofungin; blasticidin-S; cycloheximide; griseofulvin; kasugamycin; natamycin; polyoxins; polyoxorim; streptomycin; validamycin; azoxystrobin; dimoxystrobin; fluoxastrobin; kresoxim-methyl; metominostrobin; orysastrobin; picoxystrobin; pyraclostrobin; trifloxystrobin Aromatic Fungicides biphenyl; chlorodinitronaphthalene; chloroneb; chlorothalonil; cresol; dicloran; hexachlorobenzene; pentachlorophenol; quintozene; sodium pentachlorophenoxide; tecnazene Benzimidazole Fungicides benomyl; carbendazim; chlorfenazole; cypendazole; debacarb; fuberidazole; mecarbinzid; rabenzazole; thiabendazole Benzimidazole Precursor Fungicides furophanate; thiophanate; thiophanate-methyl Benzothiazole Fungicides bentaluron; chlobenthiazone; TCMTB Bridged Diphenyl Fungicides bithionol; dichlorophen; diphenylamine Carbamate Fungicides benthiavalicarb; furophanate; iprovalicarb; propamocarb; thiophanate; thiophanate-methyl; benomyl; carbendazim; cypendazole; debacarb; mecarbinzid; diethofencarb, iodopropynyl butylcarbamate Conazole Fungicides climbazole; clotrimazole; imazalil; oxpoconazole; prochloraz; triflumizole; azaconazole; bromuconazole; cyproconazole; diclobutrazol; difenoconazole; diniconazole; diniconazole-M; epoxiconazole; etaconazole; fenbuconazole; fluquinconazole; flusilazole; flutriafol; furconazole; furconazole-cis hexaconazole; imibenconazole; ipconazole; metconazole; myclobutanil; penconazole; propiconazole; prothioconazole; quinconazole; simeconazole; tebuconazole; tetraconazole; triadimefon; triadimenol; triticonazole; uniconazole; uniconazole-P Dicarboximide Fungicides famoxadone; fluoroimide; chlozolinate; dichlozoline; iprodione; isovaledione; myclozolin; procymidone; vinclozolin; captafol; captan; ditalimfos; folpet; thiochlorfenphim Dinitrophenol Fungicides binapacryl; dinobuton; dinocap; dinocap-4; dinocap-6; dinocton; dinopenton; dinosulfon; dinoterbon; DNOC Dithiocarbamate Fungicides azithiram; carbamorph; cufraneb; cuprobam; disulfiram; ferbam; metam; nabam; tecoram; thiram; ziram; dazomet; etem; milneb; mancopper; mancozeb; maneb; metiram; polycarbamate; propineb; zineb Imidazole Fungicides cyazofamid; fenamidone; fenapanil; glyodin; iprodione; isovaledione; pefurazoate; triazoxide Morpholine Fungicides aldimorph; benzamorf; carbamorph; dimethomorph; dodemorph; fenpropimorph; flumorph; tridemorph Organophosphorus Fungicides ampropylfos; ditalimfos; edifenphos; fosetyl; hexylthiofos; iprobenfos; phosdiphen; pyrazophos; tolclofos-methyl; triamiphos Oxathiin Fungicides carboxin; oxycarboxin Oxazole Fungicides chlozolinate; dichlozoline; drazoxolon; famoxadone; hymexazol; metazoxolon; myclozolin; oxadixyl; vinclozolin Pyridine Fungicides boscalid; buthiobate; dipyrithione; fluazinam; pyridinitril; pyrifenox; pyroxychlor; pyroxyfur Pyrimidine Fungicides bupirimate; cyprodinil; diflumetorim; dimethirimol; ethirimol; fenarimol; ferimzone; mepanipyrim; nuarimol; pyrimethanil; triarimol Pyrrole Fungicides fenpiclonil; fludioxonil; fluoroimide

TABLE 1-continued

Quinoline Fungicides ethoxyquin; halacrinate; 8-hydroxyquinoline sulfate; quinacetol; quinoxyfen

Quinone Fungicides benquinox; chloranil; dichlone; dithianon

Quinoxaline Fungicides chinomethionat; chlorquinox; thioquinox

Thiazole Fungicides ethaboxam; etridiazole; metsulfovax; octhilinone; thiabendazole; thiadifluor; thifluzamide

Thiocarbamate Fungicides methasulfocarb; prothiocarb

Thiophene Fungicides ethaboxam; silthiofam

Triazine Fungicides anilazine

Triazole Fungicides bitertanol; fluotrimazole; triazbutil

Urea Fungicides bentaluron; pencycuron; quinazamid

Other Fungicides acibenzolar acypetacs allyl alcohol benzalkonium chloride benzamacril bethoxazin carvone chloropicrin DBCP dehydroacetic acid diclomezine diethyl pyrocarbonate fenaminosulf fenitropan fenpropidin formaldehyde furfural hexachlorobutadiene iodomethane isoprothiolane methyl bromide methyl isothiocyanate metrafenone nitrostyrene nitrothal-isopropyl OCH 2 phenylphenol phthalide piperalin probenazole proquinazid pyroquilon sodium orthophenylphenoxide spiroxamine sultropen thicyofen tricyclazole; chitin; chitosan; 4-cumylphenol, , 4-alpha-cumylphenol.

Examples of insecticides which can be used in micronized borate compound formulations are shown in Table 2:

TABLE 2

Antibiotic Insecticides allosamidin; thuringiensin; spinosad; abamectin; doramectin; emamectin eprinomectin; ivermectin; selamectin; milbemectin; milbemycin oxime; moxidectin

Botanical Insecticides anabasine; azadirachtin; d-limonene; nicotine; pyrethrins cinerins; cinerin I; cinerin II; jasmolin I; jasmolin II; pyrethrin I; pyrethrin II; quassia; rotenone; ryania sabadilla

Carbamate Insecticides bendiocarb; carbaryl; benfuracarb; carbofuran; carbosulfan; decarbofuran; furathiocarb; dimetan; dimetilan; hyquincarb; pirimicarb; alanycarb; aldicarb; aldoxycarb; butocarboxim; butoxycarboxim; methomyl; nitrilacarb; oxamyl; tazimcarb; thiocarboxime; thiodicarb; thiofanox; allyxycarb aminocarb; bufencarb; butacarb; carbanolate; cloethocarb; dicresyl; dioxacarb; EMPC; ethiofencarb; fenethacarb; fenobucarb; isoprocarb; methiocarb; metolcarb; mexacarbate; promacyl; promecarb; propoxur; trimethacarb; XMC; xylylcarb

Dinitrophenol Insecticides dinex; dinoprop; dinosam; DNOC; cryolite; sodium hexafluorosilicate; sulfluramid

Formamidine Insecticides amitraz; chlordimeform; formetanate; formparanate

Fumigant Insecticides acrylonitrile; carbon disulfide; carbon tetrachloride; chloroform; chloropicrin; para-dicWorobenzene; 1,2-dichloropropane; ethyl formate; ethylene dibromide; ethylene dichloride; ethylene oxide; hydrogen cyanide; iodomethane; methyl bromide; methylchloroform; methylene chloride; naphthalene; phosphine; sulfuryl fluoride; tetrachloroethane

Insect Growth Regulators bistrifluron; buprofezin; chlorfluazuron; cyromazine; diflubenzuron; flucycloxuron; flufenoxuron; hexaflumuron; lufenuron; novaluron; noviflumuron; penfluron; teflubenzuron; triflumuron; epofenonane; fenoxycarb; hydroprene; kinoprene; methoprene; pyriproxyfen; triprene; juvenile hormone I; juvenile hormone II; juvenile hormone III; chromafenozide;

TABLE 2-continued halofenozide; methoxyfenozide; tebufenozide; α-ecdysone; ecdysterone; diofenolan; precocene I; precocene II; precocene III; dicyclanil
Nereistoxin Analogue Insecticides bensultap; cartap; thiocyclam; thiosultap; flonicamid; clothianidin; dinotefuran; imidacloprid; thiamethoxam; nitenpyram nithiazine; acetamiprid; imidacloprid; nitenpyram; thiacloprid
Organochlorine Insecticides bromo-DDT; camphechlor; DDT; pp'-DDT; ethyl-DDD; HCH; gamma-HCH; lindane; methoxychlor; pentachlorophenol; TDE; aldrin; bromocyclen; chlorbicyclen; chlordane; chlordecone; dieldrin; dilor; endosulfan; endrin; HEOD; heptachlor; HHDN; isobenzan; isodrin; kelevan; mirex
Organophosphorus Insecticides bromfenvinfos; chlorfenvinphos; crotoxyphos; dichlorvos; dicrotophos; dimethylvinphos; fospirate; heptenophos; methocrotophos; mevinphos; monocrotophos; naled; naftalofos; phosphamidon; propaphos; schradan; TEPP; tetrachlorvinphos; dioxabenzofos; fosmethilan; phenthoate; acethion; amiton; cadusafos; chlorethoxyfos; chlormephos; demephion; demephion-O; demephion-S; demeton; demeton-O; demeton-S; demeton-methyl; demeton-O-methyl; demeton-S-methyl; demeton-S-methylsulphon; disulfoton; ethion; ethoprophos; IPSP; isothioate; malathion; methacrifos; oxydemeton-methyl; oxydeprofos; oxydisulfoton; phorate; sulfotep; terbufos; thiometon; amidithion; cyanthoate; dimethoate; ethoate-methyl; formothion; mecarbam; omethoate; prothoate; sophamide; vamidothion chlorphoxim; phoxim; phoxim-methyl; azamethiphos; coumaphos; coumithoate; dioxathion; endothion; menazon; morphothion; phosalone; pyraclofos; pyridaphenthion; quinothion; dithicrofos; thicrofos; azinphos-ethyl; azinphos-methyl; dialifos; phosmet; isoxathion; zolaprofos; chlorprazophos; pyrazophos; chlorpyrifos; chlorpyrifos-methyl; butathiofos; diazinon; etrimfos; lirimfos; pirimiphos-ethyl; pirimiphos-methyl; primidophos; pyrimitate; tebupirimfos; quinalphos; quinalphos-methyl; athidathion; lythidathion; methidathion; prothidathion; isazofos; triazophos; azothoate; bromophos; bromophos-ethyl; carbophenothion; chlorthiophos; cyanophos; cythioate; dicapthon; dichlofenthion; etaphos; famphur; fenchlorphos; fenitrothion; fensulfothion; fenthion; fenthion-ethyl; heterophos; jodfenphos; mesulfenfos; parathion; parathion-methyl; phenkapton; phosnichlor; profenofos; prothiofos; sulprofos; temephos; trichlormetaphos-3; trifenofos; butonate; trichlorfon; mecarphon; fonofos; trichloronat; cyanofenphos; EPN; leptophos; crufomate; fenamiphos; fosthietan; mephosfolan; phosfolan; pirimetaphos; acephate; isocarbophos; isofenphos; methamidophos; propetamphos; dimefox; mazidox; mipafox
Oxadiazine Insecticides indoxacarb
Phthalimide Insecticides dialifos; phosmet; tetramethrin
Pyrazole Insecticides acetoprole; ethiprole; fipronil; tebufenpyrad; tolfenpyrad; vaniliprole
Pyrethroid Insecticides acrinathrin; allethrin; bioallethrin; barthrin; bifenthrin; bioethanomethrin; cyclethrin; cycloprothrin; cyfluthrin; beta-cyfluthrin; cyhalothrin; gamma-cyhalothrin; lambda-cyhalothrin; cypermethrin; alpha-cypermethrin; beta-cypermethrin; theta-cypermethrin; zeta-cypermethrin; cyphenothrin; deltamethrin; dimefluthrin; dimethrin; empenthrin; fenfluthrin; fenpirithrin; fenpropathrin; fenvalerate; esfenvalerate; flucythrinate; fluvalinate; tau-fluvalinate; furethrin; imiprothrin; metofluthrin; permethrin; biopermethrin; transpermethrin; phenothrin; prallethrin; profluthrin; pyresmethrin; resmethrin; bioresmethrin; cismethrin; tefluthrin; terallethrin; tetramethrin; tralomethrin; transfluthrin; etofenprox; flufenprox; halfenprox; protrifenbute; silafluofen
Pyrimidinamine Insecticides flufenerim; pyrimidifen
Pyrrole Insecticides chlorfenapyr
Tetronic Acid Insecticides spiromesifen
Thiourea Insecticides diafenthiuron
Urea Insecticides flucofuron; sulcofuron
Other Insecticides closantel; clorpyrifos, crotamiton; EXD; fenazaflor; fenoxacrim; hydramethylnon; isoprothiolane; malonoben; metoxadiazone; nifluridide; pyridaben; pyridalyl; rafoxanide; triarathene; triazamate Examples of bactericides are shown in Table 3:

TABLE 3

Bactericides bronopol; 2-(thiocyanatomethylthio) benzothiazole (busan), cresol; dichlorophen; dipyrithione; dodicin; fenaminosulf; formaldehyde; hydrargaphen; 8-hydroxyquinoline sulfate; kasugamycin; nitrapyrin; octhilinone; oxolinic acid; oxytetracycline; probenazole; streptomycin; tecloftalam thiomersal. Isothiazolone-type bactericides such as, for example, Kathon 930, Kathon WT, Methylisothiazolinone, Benzisothiazolin-3-one and 2-octyl-3-isothiazolone.

Some preferred organic biocides are listed in Table 4 below:

TABLE 4

| Name | Formula and CAS# |
|---|---|
| Azoles: | |
| Cyproconazole | $C_{15}H_{18}ClN_3O$: 94361-06-5 |
| Propiconazole | $C_{15}H_{17}ChN_3O_2$: 60207-90-1 |
| Tebuconazole | $C_{16}H_{22}ClN_3O$: 107534-96-3 |
| Busan (TCMTB) 2-(thiocyanatomethylthio) benzothiazole | $C_9H_6N_2S_3$: 21564-17-0 |
| Chlorothalonil | $C_8Cl_4N_2$: 1897-45-6 |
| Dichlofluanid | $C_9H_{11}Cl_2FN_2O_2S_2$: 1085-98-9 |
| Isothiazolone: | |
| Kathon 930 | $C_{11}H_{17}Cl_2NOS$: 64359-81-5 |
| Kathon WT | $C_4H_4ClNOS$: 26172-55-4 |
| Methylisothiazolinone | $C_4H_5NOS$: 2682-20-4 |
| Benzisothiazolin-3-one | $C_7H_5NOS$: 2634-33-5 |
| 2-octyl-3-isothiazolone | $C_{11}H_{19}NOS$: 26530-20-1 |
| Imidacloprid | $C_9H_{12}ClN_5O_2$: 138261-41-3 |
| Iodopropynyl Butylcarbamate (IPBC) | $C_8H_{12}INO_2$: 55406-53-6 |
| Pyrethroids: | |
| Bifenthrin | $C_{23}H_{22}ClF_3O_2$: 82657-04-3 |
| Cypermethrin | $C_{22}H_{19}Cl_2NO_3$: 52315-07-8 |
| Permethrin | $C_{21}H_{20}Cl_2O_3$: 52645-53-1 |
| Chitin | 1398-61-4 |
| Chitosan | 9012-76-4 |
| Clorpyrifos | $C_9H_{11}Cl_3NO_3PS$: 2921-88-2 |
| 4-cumylphenol | $C_{15}H_{16}O$ 599-64-4 |
| Fipronil | $C_{12}H_4Cl_2F_6N_4OS$: 120068-37-3 |
| Carbendazim | $C_9H_9N_3O_2$: 10605-21-7 |
| Cyfluthrin | $C_{22}H_{18}Cl_2FNO_3$: 68359-37-5 |
| 4-alpha-Cumylphenol | $C_{15}H_{16}O$: 599-64-4 |

Other biocides known by those skilled in the art that can optionally be used include mold inhibitors, algaecides, and the like.

Non-biocidal products such as water repellants (such as wax emulsions), colorants, emulsifying agents, dispersants, stabilizers, UV inhibitors, enhancing agents (such as trialkylamine oxides and alkoxylated diamines) and the like may also be added to the composition disclosed herein to enhance the appearance and performance of the resulting treated products. Those skilled in the art will recognize that some of these agents may also have some biocidal properties.

Examples of trialkylamine oxides which can be used in the compositions of the present invention include those having the following structure:

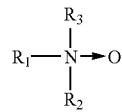

where $R_1$ is a linear or cyclic $C_8$ to $C_{40}$ saturated or unsaturated group and $R_2$ and $R_3$ independently are linear $C_1$ to $C_{40}$ saturated or unsaturated groups Examples of alkoxylated diamines which can be used in the compositions of the present invention include those having the following structure:

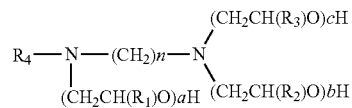

where n is an integer which can have a value of from 1 to 4; $R_1$, $R_2$ and $R_3$ are independently selected from the group consisting of hydrogen, methyl, ethyl and phenyl; and a, b and c are integers which can each have values of from 1 to 6, and $R_4$ is a straight or branched fatty alkyl group of $C_8$ to $C_{22}$.

Wood treated with boron compounds in the dispersion formulation disclosed herein exhibits reduced leaching of the compounds upon exposure of the wood to aqueous conditions such as the environment. For example, as shown in FIG. 1, after three days of exposure, the boric acid preservative leached heavily from wood treated with 1.0% boric acid. However wood treated with a 1.0% micronized zinc borate only leached about 35 wt %. Leaching was evaluated following the procedures described in American Wood Preservers' Association Standard E11-97.

Figure 2:
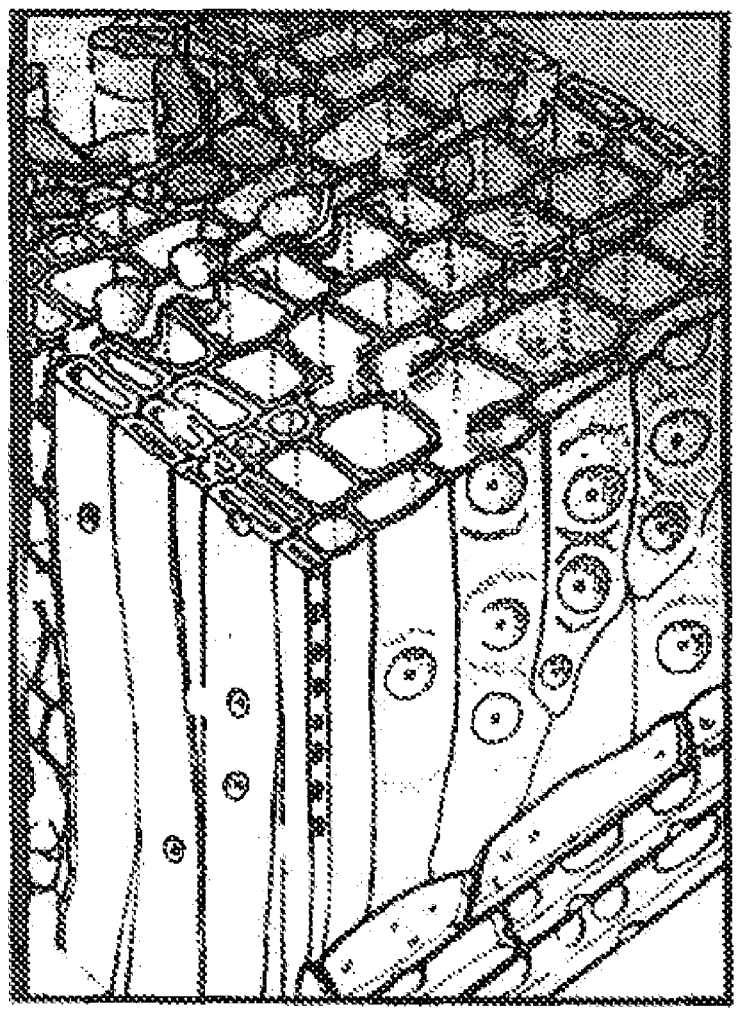
FIG. 2 depicts Coniferous Wood Anatomy.

Particle size has an effect on penetration of the dispersion formulation into the cellular structure of the wood or other cellulose-based material. Particles with sizes in excess of 30 microns may be filtered by the surface of the wood and thus may not be uniformly distributed within the cell and cell wall. As shown in FIG. 2, the primary entry and movement of fluids through wood tissue occurs primarily through the tracheids and border pits. Tracheids have a diameter of about thirty microns. Fluids are transferred between wood cells by means of border pits.

Figure 3:
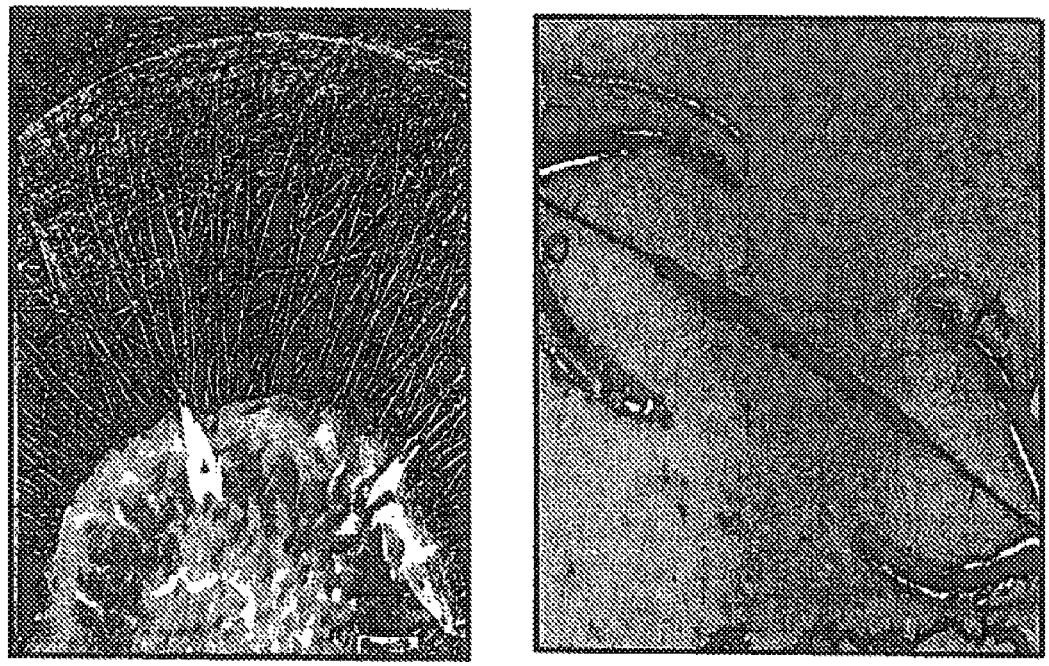
FIG. 3 depicts the border pit structure for coniferous woods.

The overall diameter of the border pit chambers typically varies from a several microns up to thirty microns while, the diameter of the pit openings (via the microfibrils) typically varies from several hundredths of a micron to several microns. FIG. 3 depicts the border pit structure for coniferous woods.

Particles having sizes smaller than the pit openings generally have an increased ability to penetrate the wood matrix. Thus, increasing weight percent of particles having diameters less that the pit openings generally correlates with increasing degree of penetration and increasing uniformity of particle distribution within the wood.

The micronized boron compounds and organic biocides used in the dispersion formulation disclosed herein typically do not have appreciable amounts of particles with sizes exceeding 30 microns or the boron compound and/or organic biocide may not effectively penetrate the wood tissue. In one embodiment, the particle size of substantially all of the micronized particles used in the dispersion formulation disclosed herein is between 0.001-10 microns. In another embodiment, the particle size of substantially all of the micronized particles is between 0.005 to 1.0 micron. In another embodiment, the particle size of substantially all of the micronized particles is between 0.05 to 10.0 microns. If a more uniform penetration is desired, particle size of substantially all of the micronized particles in the dispersion formulation disclosed herein can be between 0.05-1.0 microns. "Substantially all," as used above, means greater than 80 wt %. In other embodiments, greater than 85, 90, 95 or 99 wt % of the total particulate in the formulation satisfies the embodiments listed in this paragraph.

Particles which are too large can clog the wood, preventing it from taking in other particles and particles which are too small can leach from the wood. Thus particle size distributional parameters can affect the uniformity of particle distribution in the wood, as well as the leaching properties of treated wood. It is thus preferable, but not essential, to use particle size distributions which contain relatively few particles with sizes outside the range of 0.001 to 25 microns. It is preferred that no more than 20 weight percent of the particles have diameters which are greater than 25 microns. Because smaller particles have an increased chance of leaching from the wood, it is also preferred that no more than 20 wt % of the particles have diameters under 0.001 microns. Regardless of the foregoing recommendations, it is generally preferred that greater than 60 wt % of the particles have a diameter in the range of 0.001 to 25 microns. In more preferred embodiments, greater than 80, 85, 90, 95 or 99 wt percent of the particles are in the range of 0.001 to 25 microns.

For increased degree of penetration and uniformity of distribution, at least 50 wt % of the particles should have diameters which are less than 10 microns. More preferred are particle distributions in which at least 65 wt % of the particles have sizes of less than 10 microns. In additional embodiments, less than 20 wt % of the particles have diameters of less than 1 micron.

The present invention also provides a method for preservation of wood. In one embodiment, the method comprises the steps of treating wood with composition (treating fluid) comprising a dispersion of micronized boron compound. In another embodiment, wood is treated with a composition comprising a dispersion of micronized boron compounds and organic biocides, wherein the organic biocides are soluble or present as micronized particles. Preferably, greater than 60 wt % of the micronized particles of boron compound and organic biocide are between 0.001 and 25 microns, and in other embodiments, between 0.005 and 10 microns, between 0.05 and 10 microns and between 0.05 and 1.0 microns.

The present invention is not limited to applications which involve micronized particles which have been applied to wood as such. For example, the wood preservative effect of micronized particles can be realized by the formation of such particles in situ. By in situ, it is meant that particle formation takes place on or within the wood. Thus, the benefits of the present invention can be realized if particle formation takes place, for example, within the tracheids of the wood to be preserved. Additionally or instead, particle formation can take place outside of the tracheids, with the subsequent movement of at least some of the particles into the tracheids. Such a movement can be caused by, for example, pressure cycling, such as described in the examples. The micronized particles generally have an average size which is small enough such that the particles in the composition at least partially penetrate wood by particle migration through tracheids and border pits.

The present invention also provides a method for preservation of wood. In one embodiment, the method comprises the steps of treating wood with a composition (treating fluid) comprising one or more micronized boron compounds. The treating fluid may be applied to wood by impregnation, dipping, soaking, spraying, brushing, or other means well known in the art. In a preferred embodiment, vacuum and/or pressure techniques are used to impregnate the wood in accord with this invention, including standard processes such as the "Empty Cell" process, the "Modified Full Cell" process and the "Full Cell" process, and other vacuum and/or pressure processes which are known to those skilled in the art. It has been observed with micronized particles that in most cases, at least 10 wt % of the boron compound present in the wood or wood product substrate after treatment penetrates to a depth of 0.3 mm or greater. In other embodiments, at least 20 or 35 wt % of the micronized particles present in the wood substrate after treatment have penetrated to a depth of 0.3 mm or greater.

The standard processes are defined as described in AWPA Standard C 1-03 "All Timber Products—Preservative Treatment by Pressure Processes". In the "Empty Cell" process, prior to the introduction of preservative, materials are subjected to atmospheric air pressure (Lowry) or to higher air pressures (Rueping) of the necessary intensity and duration. In the "Modified Full Cell", prior to introduction of preservative, materials are subjected to a vacuum, preferably of less than 77 kPa (22 inch Hg) (sea level equivalent). A final vacuum which is preferably not less than 77 kPa (22 inch Hg) (sea level equivalent) is used. In the "Full Cell Process," prior to introduction of preservative or during any period of condition prior to treatment, materials are subjected to a vacuum of preferably not less than 77 kPa (22 inch Hg). A final vacuum of preferably not less than 77 kPa (22 inch Hg) is used.

The compositions and methods of the present invention enable the imparting of superior fire retardant properties characteristic of boron compounds to wood and wood products without the need for boron compound-containing glue, adhesive, filler or other matrix. The presence of boron compound inside the wood or wood product substrate can be achieved by impregnating the micronized composition into the wood rather than by fabrication of a composite wood product with a boron-compound-containing matrix. Thus, in one embodiment, the compositions of the present invention are free of plasticizers glues and other adhesives or fillers found in composite wood products.

Unless specifically set forth in conjunction with a method, the term "treatment" as used herein should not be construed as pertaining only to the application of micronized particles to wood which is to be preserved, but to all methods as a result of which micronized particles are present in the wood, such as, for example, in situ formation of micronized particles. Thus, the term "treated wood" is only intended to mean wood comprising micronized particles, irrespective of the mode of formation/delivery of the micronized particles.

Moreover, in comparison to wood which has been treated with commonly available amine-containing preservatives (such as, for example, ammonium copper quaternary compounds), wood which has been treated with micronized preservatives of the present invention is particularly resistant to mold growth. Without desiring to be bound by theory, it is thought that the amines and other nitrogenous compounds currently used in preservative compositions serve as an energy source for molds. Because the disclosed preservative compositions are free of amines, wood which has been treated with them may be found to mold to a lesser extent than wood which has been treated with amine-containing compositions and similarly exposed. Wood which has been impregnated with micronized biocidal formulations generally exhibits reduced biocide leaching relative to wood which contains non-micronized biocidal compositions. Without desiring to be bound by theory, it is thought that the ability of a given component to be solvated in an aqueous environment is one of the most important considerations with respect to leaching. All other variables being equal, easily solvated compounds and ions exhibit greater leaching than chemical species which may not have the same ability to be solvated in a given aqueous environment. Thus, the presence of a biocide in micronized form prevents much of the biocide from being in direct contact with the aqueous environment, reducing its ability to be solvated. In environments which are conducive to leaching, the result is reduced leaching.

Wood treated with the compositions of the present invention has been observed to have a uniform distribution of micronized particles. This can be observed following the American Wood Preservers' Association (AWPA) Standards A3-04 "Standard Methods for Determining Penetration of Preservatives and Fire Retardants." It can also be observed via the use of microscopy. For example, when scanning electron microscopy is combined with energy dispersive X-ray analysis (SEM-EDXA), the presence of as well as the distribution of the micronized particles can be observed. SEM-EDXA is also useful for determination of the elements present in the micronized particles and therefore, the composition of the particles can be determined. Specific staining methods can be carried out on SEM sections to determine the identity of the composition of the particles.

Many tests are available to assess flame retardancy. Thermal Gravimetric Analysis (TGA) and Differential Thermal Analysis (DTA) are two commonly performed analyses which can be used to asses the degree of flame retardancy possessed by a cellulosic substrate. Increases in flame retardancy imparted by treatment of a cellulosic substrate with the compositions and methods of the present invention can be assessed by TGA and DTA.

The following examples are provided to further describe certain embodiments of the invention but are in no way meant to limit the scope of the invention. Examples 1 through 5 demonstrate the formulation of the concentrated dispersions of boron compounds. Examples 6 through 12 demonstrate the preparation of treating fluids using concentrated dispersions for the treatment of wood.

Example 1

500 g of zinc borate were added to a container containing 650 grams of water and 100.0 grams of commercially available dispersants/wetting agents. The mixture was mechanically stirred for 5 minutes and then placed in a laboratory grinding mill. The sample was ground for about 45 minutes, and a stable dispersion containing about 40% zinc borate was obtained. The particle size of the zinc borate dispersion was analyzed by Horiba LA-910 Particle Size Distribution Analyzer (PSDA). The average particle size was 0.21 micrometers (um) with a distribution range of 0.04 um to 2.0 um.

Example 2

1000 grams of Ulexite was mixed with 1047 grams of water and 175.0 grams of commercially available wetting agents/dispersants. The mixture was mechanically stirred for 10 minutes. The mixture was then placed in a grinding mill and ground for about 60 minutes. A stable dispersion was obtained with an average particle size of 0.199 micrometers.

Example 3

1000 grams of Colemanite was mixed with 1300 grams of water and 200 grams of wetting agents/dispersants. The mixture was mechanically stirred for about 10 minutes. The mixture was then placed in a grinding mill and ground for about 45 minutes. A stable dispersion containing 40% Colemanite was obtained with an average particle size of 0.200 micrometers.

Example 4

1000 grams of hydroboracite was mixed with 1350 grams of water and 150 grams of dispersants. The mixture was mechanically mixed for about 5 minutes and placed in a grinding mill. The mixture was ground for about 60 minutes and a stable dispersion containing 40% hydroboracite was obtained with an average particle size of 0.282 micrometers.

Example 5

750 g of sodium silicate borate and 750 g of calcium silicate borate were mixed with 3200 g of water and 300 g of dispersants. The mixture was mixed for 15 minutes and then transferred into a grinding media mill. The mixture was ground for about 90 minutes and a stable dispersion containing 15% sodium silicate borate and 15% calcium silicate borate was obtained. The average particle size was 0.27 micrometers (urn) with a distribution range of 0.04 um to 2.0 um.

Example 6

4000 g of treating fluid containing 1.0% of zinc borate was prepared by mixing zinc borate dispersion from Example 1. The fluid was used to treat 2"×4"×10" southern pine samples by placing the samples in a chamber and drawing a 27" Hg vacuum for 10 minutes. The treating fluid was then drawn into the chamber and allowed to stay in contact with the wood cubes for 15 minutes. The fluid was pumped from the chamber and the resulting wood had more than doubled its weight. Cross sections of the sample were cut, and the boron and zinc penetration was conducted following the AWPA A3-04 "Standard Methods for Determining Penetration of Preservatives and Fire Retardants." The results showed 100% boron and zinc penetration.

Example 7

A preservative treating formulation was prepared by adding 100 g of zinc borate dispersion from Example 1 to 40 g of dimethyldidecyl ammonium carbonate/bicarbonate and 3860 g of water. This fluid was allowed to mix until a homogenous fluid was prepared. This fluid was used to treat southern pine test stakes measuring 0.156×1.5×10.0 inches (4×38×254 mm) by the full-cell process. The resulting stakes showed a uniform distribution of boron and zinc throughout the wood cells. The treated test stakes were installed in the field to evaluate the field performance of the preservative following the procedure described in AWPA Standard E7-01 "Standard Method of Evaluating Wood Preservatives by Field Tests with Stakes." The test results indicated that the treated stakes were resistant to decay and insect attack. The fluid was also used to treat southern pine wood cube blocks measuring ¾"×¾"×¾"

(19 mm×19 mm×19 mm). The treated cubes were exposed to several test fungi to evaluate the bio-efficacy of the preservative formulation following the procedure described in AWPA Standard E10-01 "Standard Method of Testing Wood Preservatives by Laboratory Soil-Block Cultures." Upon the completion of the soil-block test, the cubes were found to have less than 2.0% weight loss, indicating essentially no fungal attack to the treated cubes. In comparison, untreated wood cubes had approximately 50% weight loss after being exposed to the test fungi. The soil block test results indicated wood treated the above preservative formulation was resistant to fungal attack.

Example 8

A preservative treating composition was prepared by adding 0.2 kg of dispersion from Example 2 to 4.8 kg of water. The resulting fluid contained 1.8% Ulexite. This fluid was then used to treat full-size lumber using the full-cell process wherein the wood is initially placed under a vacuum of 30" Hg for 30 minutes, followed by the addition of the treating solution. The system was then pressurized for 30 minutes at 110 psi. A final vacuum of 28" Hg for 30 minutes was applied to the wood to remove residual liquid. The wood was found to contain a uniform distribution of boron throughout the cross sections and is resistant to fungal and insect attack.

Example 9

100 g of dispersion from Example 3 and 40 g of dimethyldidecyl ammonium carbonate/bicarbonate were mixed with 3860 grams of water to obtain a preservative treating fluid containing 1.0% Colemanite and 0.50% quaternary ammonium compounds. The resulting fluid was used to treat southern pine lumber using a modified full-cell process. The resulting stakes were air-dried and found to have a uniform distribution of boron throughout the cross sections and were resistant to fungal and insect attack.

Example 10

A preservative treating fluid was prepared by adding 200 g of silicate borates dispersion from Example 5 to 3800.0 g of water. The resulting fluid contained 1.5% silicate borates. The fluid was used to treat southern pine lumber using a full cell process. The treated stakes were oven dried and found to contain a uniform distribution of particles and boron penetration throughout the cross sections and were resistant to fungal and insect attack.

Example 11

As shown in Table 5, when wood was treated with boric acid at different retention levels expressed as pounds per cubic foot (pct), a very limited degree of protection against fungal and termite attack was obtained. When the micronized zinc borate from example 1 was used to treat wood, the treated wood demonstrated much greater efficacy against both fungal and termite attack in the field test. The method of treatment I both cases was a full cell treatment.

TABLE 5

Average Decay and Termite Ratings of Boric Acid and Micronized Zinc Borate Treated Wood Stakes (4 × 38 × 254 mm) 12 Months After Installation in Gainesville, Florida.*

| Preservative System | Retention, pcf | 12 MONTHS | |
|---|---|---|---|
| | | Decay | Termite |
| Untreated Wood Stakes | 0.0000 | 4.0(4) | 4.1(5) |
| Boric Acid | 0.2 | 5.1(3) | 5.1(3) |
| | 0.4 | 4.0(4) | 5.2(3) |
| | 0.6 | 4.9(3) | 4.1(4) |
| 0Micronized Zinc Borate | 0.2 | 9.7 | 7.8(1) |
| | 0.4 | 8.9(1) | 8.0(1) |
| | 0.6 | 9.8 | 9.2 |

*The Field performance test was evaluated following the procedure described in American Wood Preservers' Association (AWPA) Standard E7 -01: "Standard Method of Evaluating Wood Preservatives by Field Tests with Stakes."

The rating system for both decay grades and termite grades are described as follows:
1. Decay Grades:
   10=Sound, suspicion of decay permitted
   9=Trace decay to 3% of cross section
   8=Decay from 3 to 10% of cross section
   7=Decay from 10 to 30% of cross section
   6=Decay from 30 to 50% of cross section
   4=Decay from 50 to 75% of cross section
   0=Failure due to fungal decay
2. Termite Grades:
   10=Sound, 1 to 2 small nibbles permitted
   9=Slight evidence of feeding to 3% of cross section
   8=Attack from 3 to 10% of cross section
   7=Attack from 10 to 30% of cross section
   6=Attack from 30 to 50% of cross section
   4=Attack from 50 to 75% of cross section
   0=Failure due to termite attack If wood is treated with boron compounds in the dispersion formulation disclosed herein, the boron leaching is reduced. For example, as shown in FIG. 1, after three days leaching, boron from wood treated with 1.0% boric acid leached severely. In contrast, wood treated with a 1.0% micronized zinc borate only leached about 35%. Boron leaching was evaluated following the procedures described in American Wood Preservers' Association Standard E11-97.

Example 12

One thousand grams of zinc borate was mixed with 3000 g of water and 200 grams of commercially available wetting agents/dispersants. The mixture was mechanically stirred for 20 minutes. The mixture was then placed in a grinding mill and ground for about 40 minutes. A stable dispersion was obtained with an average particle size of 0.399 microns. A 3.0% zinc borate treating fluid was prepared by diluting the above prepared zinc borate dispersion with water. Wood samples were treated with the 3.0% zinc borate fluid and the treated samples were oven dried. The samples were tested for uniform distribution of zinc borate throughout the cross sections. Thermal Gravimetric Analysis (TGA) and Differential Thermal Analysis (DTA) tests were carried out to demonstrate superior flame retardancy to untreated wood samples.

We claim:
1. A wood or wood product substrate comprising milled particles of a zinc borate between 0.001 and 25 microns dispersed in an aqueous solution.
2. The wood or wood product substrate of claim 1, wherein the composition further comprises an organic biocide selected from the group consisting of fungicides, insecticides, insect growth regulators, or bactericides.

3. The wood or wood product substrate of claim 2, wherein the organic biocide is micronized.

4. The wood or wood product substrate of claim 3, wherein the organic biocide is tebuconazole.

5. The wood or wood product substrate of claim 1, wherein the composition further comprises a water-soluble borate compound.

6. The wood or wood product substrate of claim 1, wherein the wood or wood product substrate comprises coniferous wood.

7. The wood or wood product substrate of claim 6, the coniferous wood comprises southern pine.

8. The wood or wood product substrate of claim 1, wherein the particles of the zinc borate are distributed throughout the wood.

9. A wood or wood product substrate comprising milled particles of a copper borate between 0.005 and 25 microns dispersed in an aqueous solution.

10. The wood or wood product substrate of claim 9, wherein the composition further comprises an organic biocide selected from the group consisting of fungicides, insecticides, insect growth regulators, or bactericides.

11. The wood or wood product substrate of claim 10, wherein the organic biocide is micronized.

12. The wood or wood product substrate of claim 11, wherein the organic biocide is tebuconazole.

13. The wood or wood product substrate of claim 9, wherein the composition further comprises a water-soluble borate compound.

14. The wood or wood product substrate of claim 9, wherein the wood or wood product substrate comprises coniferous wood.

15. The wood or wood product substrate of claim 14, wherein the coniferous wood comprises southern pine.

16. The wood or wood product substrate of claim 9, wherein the particles of the copper borate are distributed throughout the wood.

* * * * *